2,996,420
Patented Aug. 15, 1961

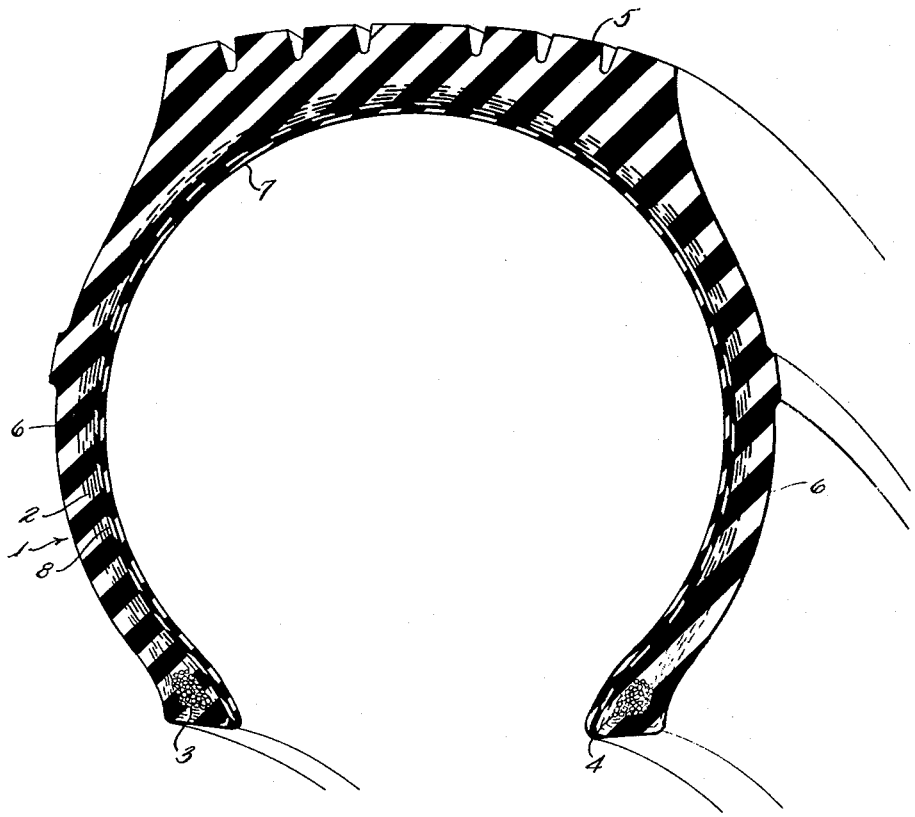

2,996,420
LAMINATED ARTICLE
Walter C. Rowe and Richard R. Sawdey, Akron, Ohio, assignors to The Firestone Tire & Rubber Company, Akron, Ohio, a corporation of Ohio
Filed Oct. 1, 1956, Ser. No. 613,094
3 Claims. (Cl. 154—139)

This invention relates to improved adhesive bonds in vulcanized structures comprised of layers of natural rubber and rubbery layers formed of copolymers of a major portion of an isoolefin and a minor portion of an open chain conjugated diolefin. More particularly, the invention relates to an improved vulcanized bond between layers of natural rubber and layers of butyl-type rubber.

The adhesion of the butyl-type polymers to natural rubber is poor for the reason that during the vulcanization reaction, the natural rubber having much greater unsaturation than the butyl-type rubber "hogs" the vulcanizing agent such as sulfur with the result that the butyl-type rubber does not vulcanize satisfactory. This difficulty has resulted in poor vulcanized adhesion between layers of natural rubber vulcanized to layers of butyl-type rubber in laminated articles.

The present invention overcomes the difficulties of the prior art in adhering natural rubber to butyl-type rubber by the addition of silica to one of the rubbery components of the laminate and the chlorination of the butyl-type rubber portion of the laminate before the article is vulcanized.

It is therefore an object of the invention to improve the vulcanized bond between layers formed from natural rubber and layers formed from copolymers of a major portion of an isoolefin having from 4 to 8 carbon atoms and a minor portion of an open chain conjugated diolefin having from 4 to 7 carbon atoms. It is also an object of the invention to improve the adhesion of layers of natural rubber to layers of butyl-type rubber by incorporating silica in one of the layers and chlorinating the butyl-type rubber. Yet a further object of the invention is to provide a rubbery article comprised of laminated layers of natural rubber and butyl-type rubber having a good vulcanized bond between layers thereof through the incorporation of silica in the rubbery polymer of one layer and the use of chlorinated butyl-type rubber in the other layer. These and other objects of the invention will be more fully understood with reference to the specification, claims and the drawing which is a perspective view partially broken away to show the invention as used in a pneumatic tubeless tire.

Butyl-type rubber used in the invention may be prepared by the procedure disclosed by Robert M. Thomas and William J. Sparks in U.S. Patent Number 2,356,128 which consists in preparing a mixture of an isoolefin such as isobutylene in the proportion of from 70 to 99 parts with an open chain conjugated diolefin such as butadiene or isoprene in the proportion of 30 to 1 parts. The mixture is then cooled to a relatively low temperature, preferably below −50° C., in the presence of a metal halide catalyst such as aluminum chloride. The polymerization results after further treatment in a rubbery vulcanizable material.

One procedure for chlorinating butyl rubber is disclosed in U.S. Patent Number 2,442,083. In the preferred preparation of chlorinated rubber, the polymer is mixed with a chlorinating material such as "Halane" (manufactured by the Wyandotte Chemical Company) on a two roll mill. Chlorine is thus incorporated in the polymer which then may be compounded with conventional compounding ingredients to produce a rubbery composition having vulcanization characteristics. Another chlorinating agent which may be mixed with butyl rubber on a mill is "Dactin" sold by E. I. du Pont de Nemours & Company. From 3 to 10 parts of Halane to 100 parts of butyl is useful in the invention while 4 to 5 parts is preferred.

The chlorinated butyl was prepared according to the following formula:

COMPOUND I

| | |
|---|---|
| GR-I 50 | 100.0 |
| Halane[1] | 4.0 |
| Stearic acid | 1.0 |

[1] Dichlorodimethyl hydantoin sold by the Wyandotte Chemical Company, Wyandotte, Michigan.

The above formulation was mixed in a Banbury mixer under conditions which yielded a temperature which reached 200° F. in 4½ minutes. The resulting product was sheeted out on a mill for use as will be described.

Although certain chlorinating materials have been set out by way of example, the invention is not limited thereto. The invention resides in using butyl rubber containing at least .8% chlorine based on the weight of butyl rubber hydrocarbon present while ranges of from .8 to 1.5% are extremely useful while about 1% is preferred.

In practicing the invention, the natural rubber is masticated on an open two roll mill or in a closed rubber mixer such as a Banbury mixer. Various pigments are added during the mastication of the natural rubber according to the following formula, all parts in this and other examples herein being by weight of 100 parts rubbery copolymers present:

*Example I*

| | A Control | B Control |
|---|---|---|
| Natural Rubber | 100.00 | 100.00 |
| Carbon Black | 25.00 | 25.00 |
| Silica [1] | | 33.00 |
| Zinc Oxide | 2.80 | 2.80 |
| Stearic Acid | 1.38 | 1.38 |
| Softener | 4.33 | 4.33 |
| Sulfur | 2.84 | 2.84 |
| Accelerator | 1.40 | 1.40 |
| Antioxidant | 2.00 | 2.00 |
| | 139.75 | 172.75 |

[1] HiSil manufactured by Columbia Southern Chemical Co., Pittsburgh, Pa.

The rubbery compounds according to the above formulation were formed into sheets on a rubber calender and prepared for lamination to the butyl layers as will be described.

In compounding the chlorinated butyl rubber portion of the laminated article, the polymer was broken down on a two roll mill and various pigments were incorporated therein according to the following formula:

*Example II*

| | |
|---|---|
| Natural rubber[1] | 20.0 |
| Chlorinated butyl rubber | 80.0 |
| Carbon black | 40.0 |
| Stearic acid | .4 |
| Zinc oxide | 7.0 |
| Oil | 3.0 |
| Retarder | .3 |
| Sulfur | 2.0 |
| Mercaptobenzothiazole | .7 |
| Tetramethyl thiuram disulfide | .35 |
| | 153.75 |

[1] Present to provide building tack.

The chlorinated butyl-type rubber compound of Example II was sheeted out on a calender to a thickness of one quarter inch and cut into sheets having a dimension of 6 inches x 9 inches. A sheet was superimposed on each of a sheet of the natural rubber compounds of Example I to form laminated structures. A strip of holland cloth was placed between the two sheets at the edges thereof to provide two free ends after vulcanization. (The ends are grasped by the testing machine after vulcanization and used to pull the vulcanized sheets apart to measure adhesion.) Each structure was sandwiched between two sheets of unvulcanized rubberized weftless fabric and each was vulcanized in a vulcanizing press at a temperature of 280° F. for 90 minutes, removed from the press and cut into strips 1" wide. The free ends were mounted respectively in the jaws of a Cooey adhesion tester and drawn apart at a rate of 2 inches per minute. Adhesion between the vulcanized sheets is measured in pounds/inch at both ambient temperature and at an elevated temperature of 212° F.

Adhesion results were as follows:

TABLE I

| | Sheet 1—Example II | Sheet 2—Example I |
|---|---|---|
| | Chlorinated Butyl-Type Rubber. Natural Rubber (Formula A with no SiO$_2$). | Chlorinated Butyl-Type Rubber. Natural Rubber (Formula B with 33 parts of SiO$_2$). |
| Cooey Adhesion in lbs./inch: | | |
| Room Temp | 52 lbs | 62 lbs. |
| At 212° F | 26 lbs | 48 lbs. |

The results of the above table show that the combined use of silica in natural rubber layer with chlorine in the butyl rubber greatly improves the hot and cold adhesion between the layers. The rate of vulcanization of the natural rubber portion containing silica is retarded somewhat. This may be corrected by increasing the sulfur and/or accelerator to adjust the rate to that required. Other ingredients which may be added to both the natural rubber portion and the butyl-type rubber portion include antioxidants, softeners and reinforcing pigments as necessary to obtain desired results without effecting the improved adhesion obtained by the invention.

From the above results, it may be noted that the presence of silica in the natural rubber component of a laminated article greatly improves the adhesion of that component to adjacent chlorinated butyl rubber portions to which it is vulcanized. For best results within the range of the invention, from 20 to 60 parts of silica based on 100 parts by weight of natural rubber present is used while from 30 to 40 parts is preferred.

The silica may be added to the butyl-type rubber portion of the combination as well as to the natural rubber portion. When silica is added to the butyl-type rubber portion, the steps of mixing the compounds and vulcanizing may be carried out as described with the same improved adhesion. The silica preferred is hydrated SiO$_2$ sold by the Columbia Southern Chemical Company under the trade name of HiSil.

Referring to the drawing, a tubeless pneumatic passenger tire generally indicated at 1 is comprised of a fabric reinforced portion 2 terminating at each edge in inextensible beads 3 and 4. Superimposed on fabric portion 2 is a tread portion 5 and a sidewall portion 6. To make the tire a pneumatic container without the use of an inner tube, a liner portion 7 of butyl-type rubber is adhered across the open belly of the tire from bead to bead.

To adhere the liner 7 to the tire casing in view of the present invention, an intermediate layer 8 comprised of natural rubber loaded with silica is inserted between the casing and the liner and adhered to both these portions by vulcanization. Whereas the prior art butyl-type rubber liner would separate from the belly of the tire casing during operation of the tire because of the poor adhesion of butyl-type rubber to natural rubber, the present invention through the use of the ply 8 together with chlorinated butyl-type rubber provides satisfactory adhesion to make the liner 7 an intregal part of the tire.

The natural rubber layer may be applied to the unvulcanized layers of the article to be vulcanized as a solvent adhesive. To do this, a stock of the formulation such as shown in Example I is dissolved in a rubber solvent such as gasoline, toluene, xylene or the like until a total solids concentration of about 10% by weight is obtained. The adhesive may then be used to adhere a chlorinated butyl-type rubber layer to the other rubbery layers of a laminated article.

Referring to the drawing, the ply 8 may be applied either as a calendered sheet or as an adhesive solution as described above. When applied as an adhesive, the belly of the unvulcanized tire band is coated with the adhesive solution and allowed to stand until the solvent portion of the adhesive evaporates leaving a tacky surface. The unvulcanized sheet of butyl-type rubber next is applied to the tacky surface and pressed into intimate face to face contact with the surface, care being taken to prevent trapping of air between the butyl-type rubber sheet and the tire band. The tire is shaped and vulcanized with heat and pressure in a conventional manner with the result that the butyl-type rubber layer 7 is firmly adhered to the tire casing.

Those skilled in the art will be able to select compounding pigments such as vulcanizing agents, antioxidants, softeners, reinforcing agents and the like to arrive at desired physical properties for the vulcanized compounds of the invention.

Although several forms have been illustrated by way of example, it will be apparent to those skilled in the art that modification may be made in the invention within the scope of the following claim.

We claim:

1. The process of adhering a solid body of a vulcanizable rubbery isoolefin-polyolefin interpolymer to a body of vulcanizable natural rubber comprising chlorinating the interpolymer so that it contains at least .8% chlorine based on the weight of interpolymer, introducing from 20 to 60 parts by weight of silica per 100 parts by weight of natural rubber into the natural rubber body, placing adjacent surfaces of bodies in contacting relation and applying heat and pressure to vulcanize said bodies and to thereby adhere said contacting surfaces to each other whereby a strong adhesive bond is formed between said contacting surfaces.

2. The process of adhering a solid body of a vulcanizable rubbery isoolefin-polyolefin interpolymer to a body of vulcanizable natural rubber comprising chlorinating the interpolymer so that it contains from .8% to 1.5% chlorine based on the weight of interpolymer, introducing from 20 to 60 parts by weight of silica per 100 parts by weight of natural rubber into the natural rubber body, placing adjacent surfaces of bodies in contacting relation and applying heat and pressure to vulcanize said bodies and to thereby adhere said contacting surfaces to each other whereby a strong adhesive bond is formed between said contacting surfaces.

3. The process of adhering a solid body of a vulcanizable rubbery isoolefin-polyolefin interpolymer to a body of vulcanizable natural rubber comprising chlorinating the interpolymer so that it contains at least .8% chlorine based on the weight of interpolymer, introducing at least 20 parts by weight of silica per 100 parts by weight of vulcanizable natural rubber into the natural rubber body, placing adjacent surfaces of bodies in contacting relation, and applying heat and pressure to said contacting bodies to vulcanize said bodies and to thereby adhere said contacting surfaces to each other, whereby a strong adhesive bond is formed between said contacting surfaces.

References Cited in the file of this patent

UNITED STATES PATENTS

| | | |
|---|---|---|
| 2,442,083 | Hall et al. | May 25, 1948 |
| 2,698,042 | Perkins | Dec. 28, 1954 |
| 2,760,894 | Wolf | Aug. 28, 1956 |
| 2,788,839 | Kindle et al. | Apr. 16, 1957 |
| 2,804,448 | Hallenbeck | Aug. 27, 1957 |